United States Patent
Kuroda

(10) Patent No.: US 7,206,571 B2
(45) Date of Patent: Apr. 17, 2007

(54) CALL DEVICE, CALL CONTROL SYSTEM, CALL MANAGEMENT SYSTEM, AND CALL CONTROL METHOD

(75) Inventor: Yuri Kuroda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/070,004

(22) Filed: Mar. 3, 2005

(65) Prior Publication Data

US 2005/0203666 A1 Sep. 15, 2005

(30) Foreign Application Priority Data

Mar. 11, 2004 (JP) .............................. 2004-069197

(51) Int. Cl.
*H04M 3/42* (2006.01)

(52) U.S. Cl. ................ 455/415; 455/412.1; 455/412.2; 455/413; 455/414.2

(58) Field of Classification Search ............. 455/412.1, 455/412.2, 413, 414.1, 414.2, 415, 67.7
See application file for complete search history.

(56) References Cited

U.S. PATENT DOCUMENTS

| 6,407,325 | B2 | 6/2002 | Yi et al. |
| 2002/0045438 | A1* | 4/2002 | Tagawa et al. ............. 455/412 |
| 2003/0078034 | A1 | 4/2003 | Tsutsumi et al. |
| 2005/0107075 | A1* | 5/2005 | Snyder ........................ 455/418 |
| 2005/0117726 | A1* | 6/2005 | DeMent et al. ......... 379/142.01 |
| 2005/0207555 | A1* | 9/2005 | Lee et al. .............. 379/207.16 |
| 2005/0239446 | A1* | 10/2005 | Tagawa et al. .......... 455/414.1 |
| 2005/0246193 | A1* | 11/2005 | Roever et al. ................. 705/1 |
| 2005/0276410 | A1* | 12/2005 | Hayakawa et al. .... 379/374.01 |

FOREIGN PATENT DOCUMENTS

| JP | 03-143095 | 6/1991 |
| JP | 11-236848 | 8/1999 |
| JP | 2002-101206 | 4/2002 |
| JP | 2002-281125 | 9/2002 |
| JP | 2002-344571 | 11/2002 |
| KR | 2001-0095712 | 11/2001 |
| WO | WO 01/47215 | 6/2001 |
| WO | WO 01/67718 | 9/2001 |
| WO | WO2005/048571 A2 | 5/2005 |

OTHER PUBLICATIONS

Taiwanese Office Action dated Jun. 19, 2006 with English translation of pertinent portions.
Japanese translation of Tawainese Office Action dated Jun. 19, 2006.
U.K. Office Action dated Nov. 1, 2006.

* cited by examiner

*Primary Examiner*—Duc M. Nguyen
*Assistant Examiner*—Dai Phuong
(74) *Attorney, Agent, or Firm*—Whitham, Curtis, Christofferson & Cook, PC

(57) ABSTRACT

When a controller receives an incoming call signal, the controller supplies melody information stored in a melody information storage to a sound source. The sound source starts to output a melody, represented by the melody information, from a speech speaker. When an input unit accepts a talk start command, the controller operates a superimposer. The superimposer superimposes a melody signal on a speech signal, and a speech speaker outputs a superimposed sound.

8 Claims, 8 Drawing Sheets

| REGISTERED PERSON | RINGER MELODY CONTINUED | RING BACK MELODY CONTINUED | SYNCHRONIZATION | MUSIC PIECE |
|---|---|---|---|---|
| REGISTERED PERSON a | ○ | | | MUSIC PIECE A |
| REGISTERED PERSON b | | ○ | | MUSIC PIECE B |
| REGISTERED PERSON c | | | ○ | MUSIC PIECE C |
| REGISTERED PERSON d | ○ | ○ | ○ | MUSIC PIECE D |

*Figure 6*

| REGISTERED PERSON | RINGER MELODY CONTINUED | RING BACK MELODY CONTINUED | SYNCHRONIZATION | MUSIC PIECE |
|---|---|---|---|---|
| REGISTERED PERSON a | ○ | | | MUSIC PIECE A |
| REGISTERED PERSON b | | ○ | | MUSIC PIECE B |
| REGISTERED PERSON c | | | ○ | MUSIC PIECE C |
| REGISTERED PERSON d | ○ | ○ | ○ | MUSIC PIECE D |

*Figure 7*

CALL DEVICE, CALL CONTROL SYSTEM, CALL MANAGEMENT SYSTEM, AND CALL CONTROL METHOD

BACKGROUND OF THE INVENTION

1. Field of the Invention

The present invention relates to a call device, a call control system, a call management system, and a call control method.

2. Description of the Related Art

There have heretofore been available in the art cellular phone terminals which output a melody (hereinafter referred to as "ringer melody") that is preset by the user of a cellular phone terminal as a recipient's terminal during a period of time after the cellular phone terminal has received an incoming call until the user starts to talk to the calling party. There have also been available in the art cellular phone terminals which output a melody (hereinafter referred to as "ring back melody") that is preset by the user of a cellular phone terminal for a recipient's terminal during a period of time after a cellular phone terminal has sent an outgoing call until the parties start talking to each other.

The user of a cellular phone terminal presets a preferred melody as a ringer melody or a ring back melody. Therefore, the user, who owns a cellular phone terminal which outputs a ringer melody or a ring back melody, can enjoy the music until the parties start talking to each other through the cellular phone terminal.

There has been proposed a call device, which is capable of superimposing a music signal on a speech signal representative of speech for the user to enjoy the music while talking to the other party.

For example, Document 1 (Japanese laid-open patent publication No. 2002-101206) discloses a telephone communication service management device for superimposing speech advertisement information such as music information on speech information and outputting the combined information. The telephone communication service management device presets the speech advertisement information.

Document 2 (Japanese laid-open patent publication No. 2002-344571) reveals a call device for superimposing a music signal on a speech signal and outputting the superimposed signal. The user of a cellular phone terminal presets the music signal.

Ringer melodies or ring back melodies give a certain level of enjoyment to the users of cellular phone terminals.

However, it is desirable for ringer melodies or ring back melodies to give further enjoyment to the users of cellular phone terminals.

At present, a cellular phone terminal outputs a ringer melody or a ring back melody for a short period of time from the arrival of an incoming call to the start of the connection. Therefore, the user of a cellular phone terminal can enjoy the music that is preset by the user of a cellular phone terminal as a recipient's terminal, for a short period of time from the arrival of an incoming call to the start of the connection.

According to Document 1, the music and the speech which are outputted together, are provided by the telephone communication service management device, without any reference to the called party. Therefore, the telephone communication service management device may possibly output music together with speech, which the called party is not fond of.

The telephone communication service management device disclosed in Document 1 is also disadvantageous in that if a ringer melody or a ring back melody is preset, then the music, which is output after the arrival of an incoming call until the parties start to talk to each other, is different from the music, which is output while the parties are talking to each other. Therefore, the user of a cellular phone terminal can enjoy the music (a ringer melody or a ring back melody) that is preset by the user of a cellular phone terminal for a recipient's terminal, only during a short period of time after the arrival of an incoming call until the connection is established.

With the call device disclosed in Document 2, if a ringer melody or a ring back melody is preset, then the music, which is output from the arrival of an incoming call until the parties start to talk to each other, may possibly be different from the music, which is output while the parties are talking to each other. Consequently, the user of a cellular phone terminal can enjoy a ringer melody or a ring back melody, only during a short period of time after the arrival of an incoming call until the connection is established.

Another problem is that the called party who has preset a ring back melody is unable to confirm the amount of the ring back melody to which the calling party has already listened. Therefore, the called party cannot judge whether the calling party has fully enjoyed the ring back melody or not.

SUMMARY OF THE INVENTION

It is an object of the present invention to provide a call device, a call control system, a call management system, and a call control method, which allow the user of the call device to fully enjoy music that is output after the arrival of an incoming call until the user starts to talk to the calling party.

A call device according to present invention outputs a non-output part of a melody for a predetermined period of time and caller's speech when a talk start command is accepted while the melody for the predetermined period of time is being output. The melody for the predetermined period of time starts being output when an incoming call signal is received. Therefore, the melody for the predetermined period of time is output until its end even when the parties that are involved start talking to each other. The user of the call device can thus fully enjoy the melody for the predetermined period of time, which is output after the arrival of the incoming call signal.

In the call device according to present invention, the melody should preferably be output at a lower volume after the talk start command is accepted, than before the talk start command is accepted. The melody for the predetermined period of time is therefore prevented from obstructing the conversation.

When the talk start command is accepted while the melody for the predetermined period of time is being output, the non-output part of the melody should preferably be superimposed on the speech of the conversation. In this case, the melody is used as BGM (background music) for the conversation.

The melody and the speech of the conversation may be output separately. With this modification, an arrangement for superimposing the melody and the speech on each other may be dispensed with, resulting in a simplified call device structure.

A call control system according to the present invention superimposes a non-transmitted part of a melody signal and a speech signal on each other and starts transmitting a superimposed sound signal when the speech signal is received from a recipient's call device while the melody signal is being transmitted to a caller's call device. The melody signal starts being transmitted when an incoming call signal is transmitted.

Therefore, a melody for a predetermined period of time which is represented by the melody signal is output until its end as BGM for the conversation even when the parties that are involved, i.e., the caller's call device and the recipient's call device, start talking to each other. The user of the caller's call device can thus fully enjoy the melody that is output upon the transmission of an outgoing call signal.

In the call control system according to the present invention, the melody should preferably be output at a lower volume after the speech signal that is supplied from the recipient's call device is received, than before the speech signal that is supplied from the recipient's call device is received. The melody is therefore prevented from obstructing the conversation.

When the speech signal is received while the melody signal is being transmitted, it is preferable to superimpose the non-transmitted part of the melody signal on the speech signal to generate a superimposed sound signal, and transmit the superimposed sound signal to the caller's call device.

In this case, the call control system generates the superimposed sound signal. Accordingly, the recipient's call device is not required to generate the superimposed sound signal and transmit the generated superimposed sound signal through the call control system to the caller's call device.

Melody information which represents the melody signal should preferably be preset as desired by the user of the recipient's call device, and the music title of the melody and the name of the vendor thereof should preferably be transmitted to the caller's call device.

The user of the caller's call device is thus able to know the music title of the melody or the name of the vendor thereof which is preset as desired by the user of the recipient's call device. Therefore, the purchase of the melody can be promoted.

A call management system according to the present invention includes the call device referred to above and the call control system referred to above wherein the call device is used as the recipient's call device. A call device melody information storage stores melody information which is identical to melody information that is stored in a system melody information storage.

When an incoming call signal is transmitted to the recipient's call device, the recipient's call device starts outputting the melody, and the call control system transmits the melody signal which represents the melody to the caller's call device. Therefore, the caller's call device and the recipient's call device output the same melody synchronously until the melody ends. Therefore, the user of the recipient's call device and the user of the caller's call device can enjoy the same melody from the beginning to the end even if the users are in remotely spaced locations.

In the call management system according to the present invention, the recipient's call device should preferably superimpose the melody and the speech on each other after the user of the recipient's call device and the user of the caller's call device have started talking to each other. In this case, the call control system suffers a smaller burden because it is not required to superimpose the melody and the speech on each other after the user of the recipient's call device and the user of the caller's call device have started talking to each other.

In the call management system according to the present invention, the call control system may superimpose the melody and the speech on each other after the user of the recipient's call device and the user of the caller's call device have started talking to each other. In this case, the recipient's call device suffers a smaller burden because it is not required to superimpose the melody and the speech on each other after the user of the recipient's call device and the user of the caller's call device have started talking to each other.

In the call management system according to the present invention, the call control system and the recipient's call device may superimpose the melody and the speech on each other after the user of the recipient's call device and the user of the caller's call device have started talking to each other. In this case, the processing burden on either the recipient's call device or the call control system is prevented from being unduly increased because neither the recipient's call device nor the call control system alone superimposes the melody and the speech on each other after the user of the recipient's call device and the user of the caller's call device have started talking to each other.

In the call management system according to the present invention, the recipient's call device and the caller's call device output the same melody synchronously. Consequently, the recipient can confirm the amount of the ring back melody to which the calling party has already listened.

According to the present invention, the user of the call device can fully enjoy the melody for the predetermined period of time.

According to the present invention, furthermore, the user of the recipient's call device and the user of the caller's call device can enjoy the same melody from the beginning to the end even if the users are in remotely spaced locations.

The above and other objects, features, and advantages of the present invention will become apparent from the following description with reference to the accompanying drawings which illustrate examples of the present invention.

BRIEF DESCRIPTION OF THE DRAWINGS

FIG. 6 is a diagram showing an example of information that is preset in a recipient's terminal;

FIG. 7 is a diagram showing an example of information that is preset in a telephone communication network;

DETAILED DESCRIPTION OF THE PREFERRED EMBODIMENTS

Figure 1:
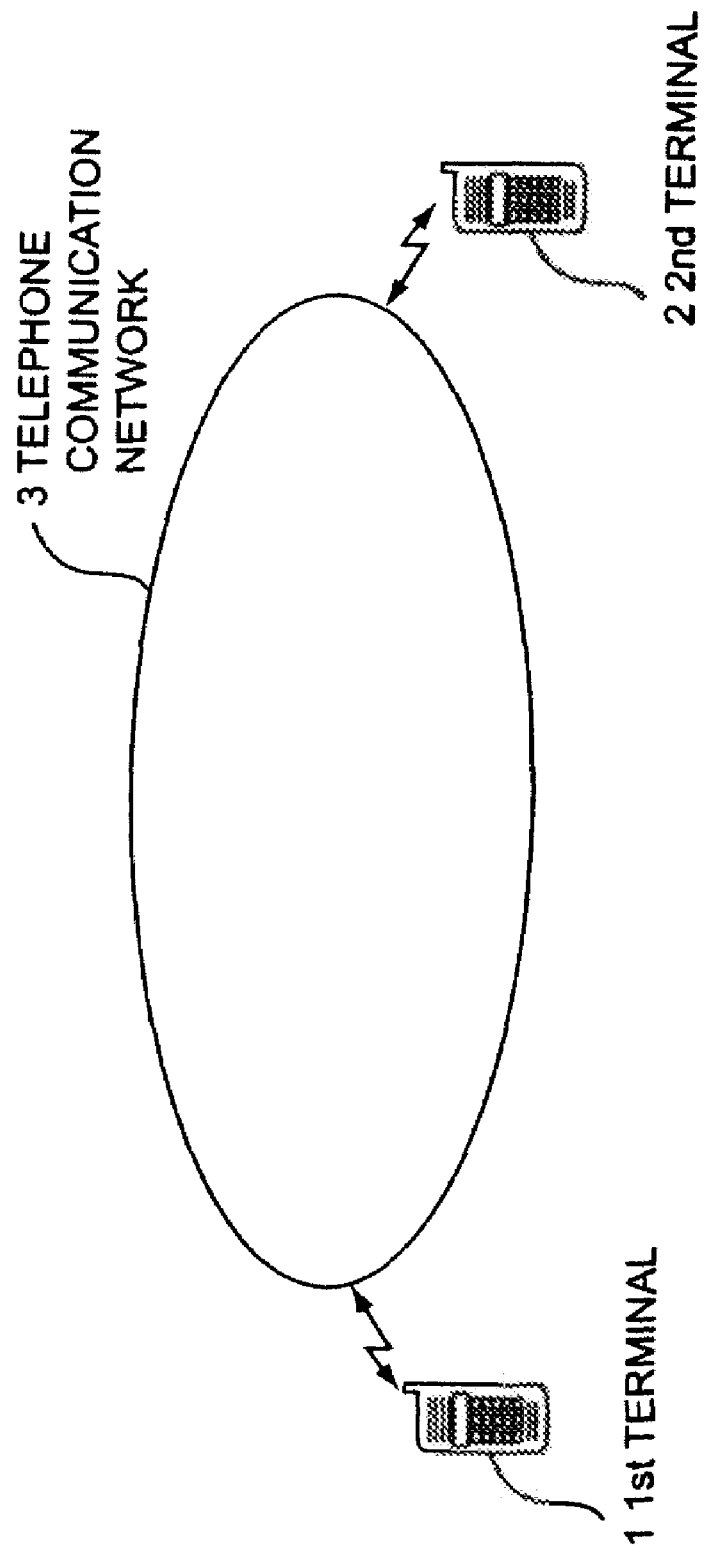
FIG. 1 is a diagram of a call system according to an embodiment of the present invention.

FIG. 1 shows in block form a call system according to an embodiment of the present invention. As shown in FIG. 1, the call system includes first terminal 1, second terminal 2, and telephone communication network 3.

Each of first terminal 1 and second terminal 2 serves as a call device. In the present embodiment, a cellular phone terminal is used as each of first terminal 1 and second terminal 2. However, each of first terminal 1 and second terminal 2 is not limited to a cellular phone terminal, but may be another device or terminal.

In the present embodiment, second terminal 2 is structurally identical to first terminal 1.

Though only two terminals are shown in FIG. 1, the call system may include as many terminals as desired, rather than two terminals.

Telephone communication network 3 is an example of a call control system according to an embodiment of the present invention. Telephone communication network 3 may, for example, be a cellular phone switching network.

A call management system according to an embodiment of the present invention includes telephone communication network 3 and first terminal 1 or second terminal 2.

Figure 2:
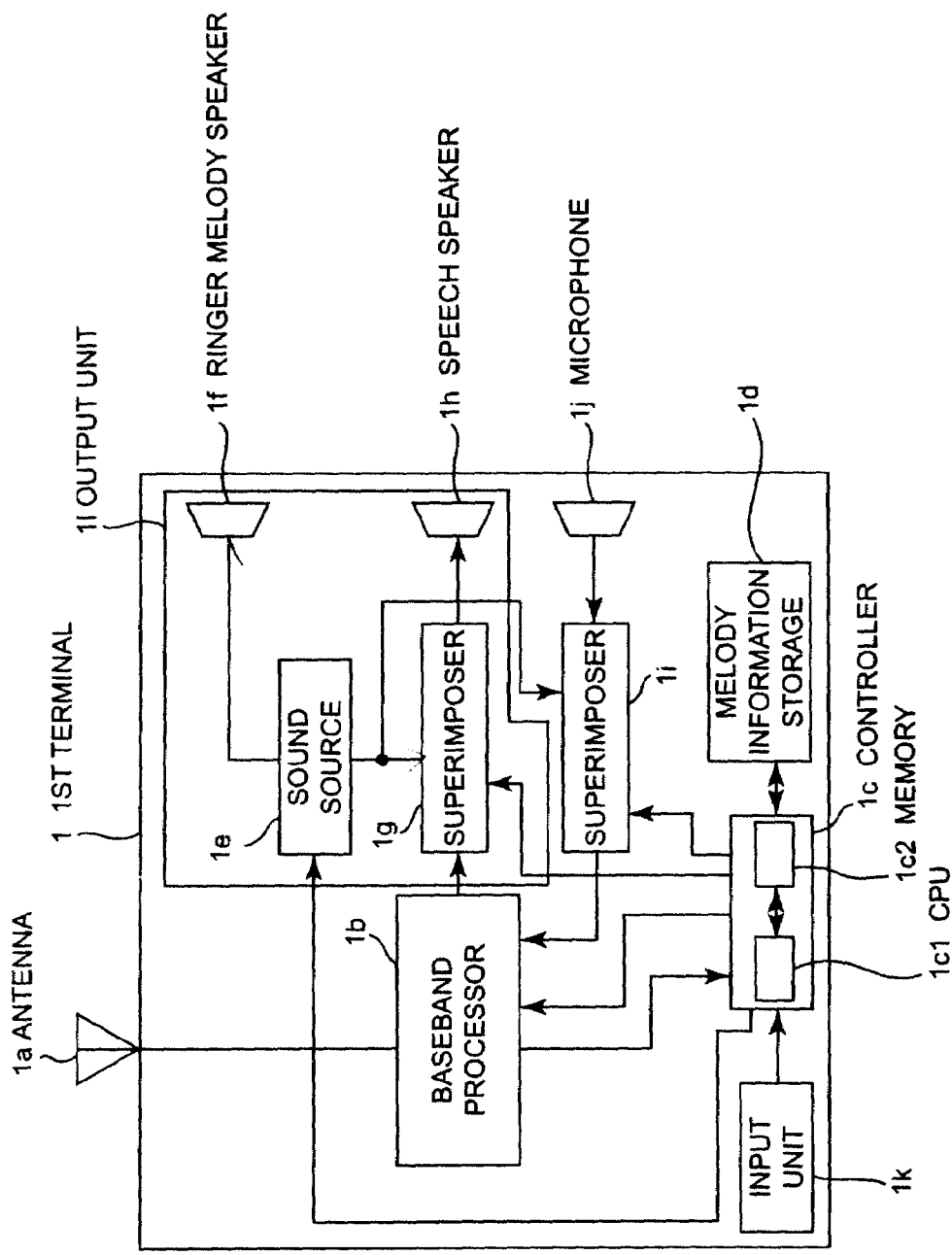
FIG. 2 is a block diagram of a call device according to an embodiment of the present invention.

FIG. 2 shows first terminal 1 in block form. First terminal 1 serves as a call device according to an embodiment of the present invention. Because second terminal 2 is structurally identical to first terminal 1, second terminal 2 will not be described in detail below.

As shown in FIG. 2, first terminal 1 has antenna $1a$, baseband processor $1b$, controller $1c$, melody information storage $1d$, sound source $1e$, ringer melody speaker $1f$, superimposer $1g$, speech speaker $1h$, superimposer $1i$, microphone $1j$, and input unit $1k$.

Sound source $1e$, ringer melody speaker $1f$, superimposer $1g$, and speech speaker $1h$ are included in output unit $1l$.

First terminal 1 continuously outputs a ringer melody even after the parties that are involved start talking to each other. Because second terminal 2 is structurally identical to first terminal 1, second terminal 2 also continuously outputs a ringer melody even after the parties that are involved start talking to each other.

Antenna $1a$ receives a radio signal that is transmitted from telephone communication network 3. Antenna $1a$ transmits a radio signal to telephone communication network 3.

Baseband processor $1b$ serves as a receiver. Baseband processor $1b$ detects an incoming call signal and a baseband signal from the radio signal that is received by antenna $1a$. The baseband signal includes a speech signal representative of speech that has been entered into a terminal, e.g., second terminal 2, that is connected to first terminal 1.

Baseband processor $1b$ supplies the detected incoming call signal to controller $1c$. Baseband processor $1b$ also supplies the detected baseband signal to superimposer $1g$.

Baseband processor $1b$ modulates an output signal from superimposer $1g$, and transmits the modulated signal as a radio signal from antenna $1a$.

While first terminal 1 is in a wait mode, baseband processor $1b$ detects only an incoming call.

Baseband processor $1b$ starts a baseband processing sequence under the control of controller $1c$. The baseband processing sequence includes a process of detecting a baseband signal and a process of modulating an output signal from superimposer $1g$ and of transmitting the modulated signal as a radio signal from antenna $1a$.

Melody information storage $1d$ stores melody information which represents a melody, i.e., a ringer melody, for a predetermined period of time.

The melody information is preset as desired by the user of first terminal 1. For example, melody information storage $1d$ stores melody information that the user of first terminal 1 has purchased from a certain melody purchase site.

Controller $1c$ includes CPU $1c1$ and memory $1c2$. CPU $1c1$ is an example of a computer. Memory $1c2$ is an example of a recording medium that can be read by a computer.

Memory $1c2$ stores a program that represents an operation sequence of first terminal 1. CPU $1c1$ reads the program stored in memory $1c2$, and executes the program to control first terminal 1.

A processing sequence that is executed by CPU $1c1$ will hereafter be described as a processing sequence that is executed by controller $1c$.

When controller $1c$ receives an incoming call signal from baseband processor $1b$, controller $1c$ reads the melody information stored in melody information storage $1d$. Controller $1c$ then supplies the read melody information to sound source $1e$.

When sound source $1e$ receives the melody information, sound source $1e$ starts outputting a melody signal, which represents the melody for the predetermined period of time that is represented by the melody information. Sound source $1e$ supplies the melody signal to ringer melody speaker $1f$, superimposer $1g$, and superimposer $1i$.

Ringer melody speaker $1f$ starts outputting the melody that is represented by the melody signal that is supplied from sound source $1e$, i.e., a ringer melody.

Input unit $1k$ is an example of a talk start command input unit. Input unit $1k$ receives a talk start command from the user of first terminal 1.

When input unit $1k$ receives a talk start command from the user, controller $1c$ instructs baseband processor $1b$ to start performing the baseband processing sequence. Furthermore, when input unit $1k$ receives a talk start command from the user, controller $1c$ instructs superimposer $1g$ and superimposer $1i$ to operate.

Superimposer $1g$ is controlled by controller $1c$. Superimposer $1g$ superimposes the melody signal that is supplied from the sound source $1e$ on the speech signal that is supplied from baseband processor $1b$, thereby generating a superimposed signal.

Speech speaker $1h$ outputs a superposed sound that depends on the superimposed signal that is generated by superimposer $1g$.

Therefore, when input unit $1k$ receives a talk start command from the user while ringer melody speaker $1f$ is outputting a melody for a predetermined period of time, speech speaker $1h$ starts outputting a superposed sound that depends on the superimposed signal that is generated by superimposer $1g$.

The superimposed sound includes a non-output part of the melody that is superimposed on the speech, which is represented by the speech signal received by baseband processor $1b$.

Superimposer $1g$ superimposes the melody signal on the speech signal such that the volume of the melody, which is output from speech speaker $1h$ after input unit $1k$ has received a talk start command, will be lower than the volume of the melody, which is output from ringer melody speaker $1f$ before input unit $1k$ receives the talk start command.

Microphone $1j$ receives speech from the user of first terminal 1 and converts the received speech into a speech signal.

Superimposer $1i$ is controlled by controller $1c$. Superimposer $1i$ receives a speech signal from microphone $1j$, and superimposes the speech signal on a melody signal that is supplied from sound source $1e$ to generate a superimposed signal. Superimposer $1i$ supplies the superimposed signal to baseband processor $1b$.

Figure 3:
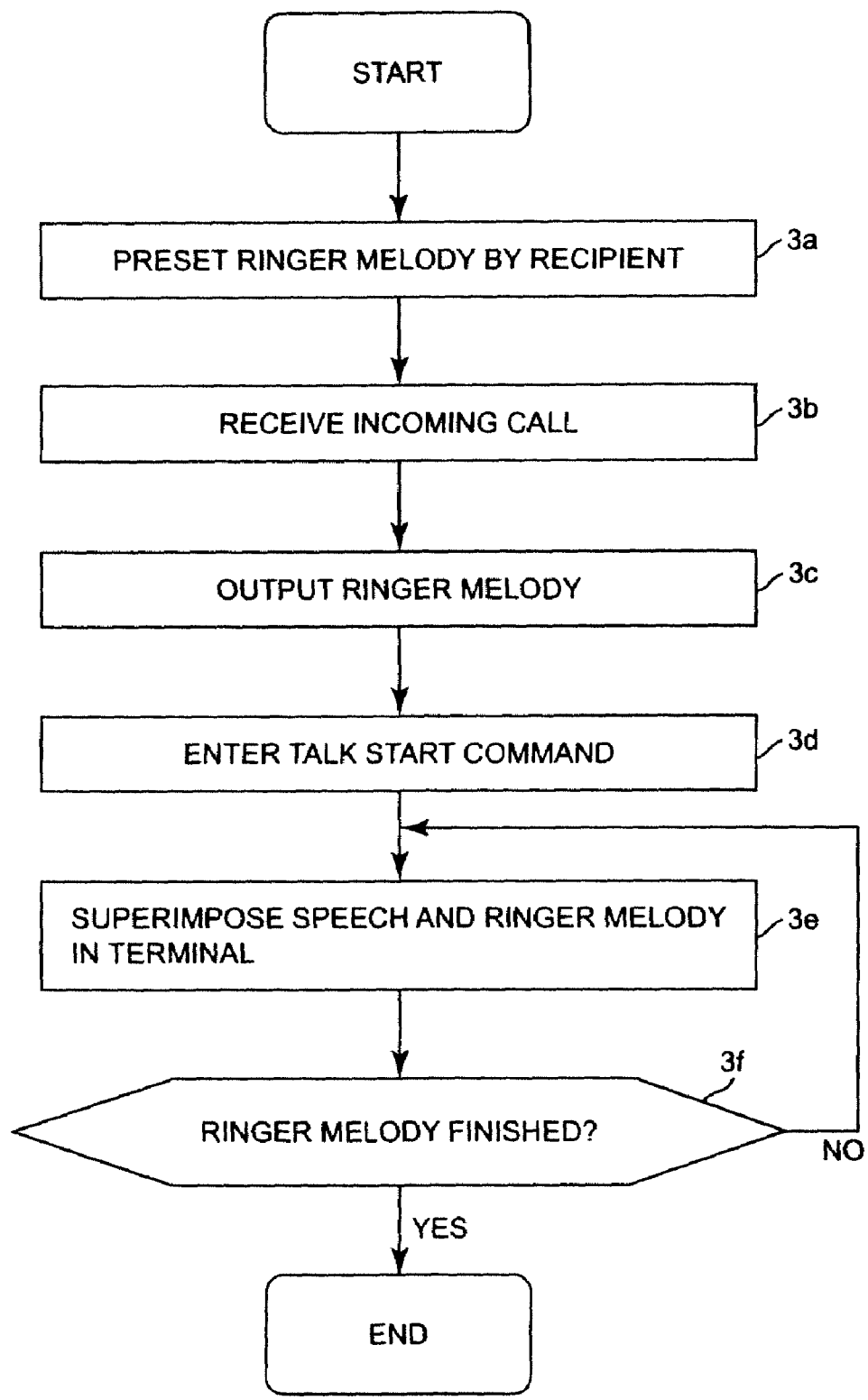
FIG. 3 is a flowchart of an operation sequence of the call device shown in FIG. 2.

FIG. 3 shows an operation sequence of first terminal 1. Operation of first terminal 1 which functions as a recipient's terminal will be described below with reference to FIG. 3.

In the present embodiment, telephone communication network 3 supplies first terminal 1 with a speech signal from a calling party, with no melody signal superimposed thereon, and an incoming call signal.

Telephone communication network 3 supplies a caller's terminal with a signal that represents speech that is supplied from first terminal 1, with no melody signal superimposed thereon.

Telephone communication network 3 may supply a caller's terminal with a melody signal that represents a ring back melody until the parties that are involved start talking to each other.

In step 3a shown in FIG. 3, melody information that represents a melody (a ringer melody) for a predetermined period of time is stored in melody information storage 1d based on a control action that is made on input unit 1k by the user of first terminal 1.

In step 3b, when baseband processor 1b in the wait mode detects an incoming call signal from a radio signal received by antenna 1a, baseband processor 1b supplies the detected incoming call signal to controller 1c.

In response to the incoming call signal, controller 1c reads the melody information that is stored in melody information storage 1d, and supplies the read melody information to sound source 1e.

When sound source 1e receives the melody information, sound source 1e starts outputting a melody signal that represents the melody for the predetermined period of time that is represented by the melody information.

Sound source 1e supplies the melody signal to ringer melody speaker 1f, superimposer 1g, and superimposer 1i.

In step 3c, ringer melody speaker 1f starts outputting a ringer melody that is represented by the melody signal supplied from sound source 1e.

Therefore, when baseband processor 1b detects an incoming call signal, ringer melody speaker 1f starts outputting the melody (the ringer melody) for the predetermined period of time that is represented by the melody information stored in melody information storage 1d.

At this time, though superimposer 1g and superimposer 1i are supplied with the melody signal, superimposer 1g and superimposer 1i have not yet activated, because they have not received an operation command from controller 1c. At this time, furthermore, baseband processor 1b has not performed the baseband processing sequence. Therefore, speech speaker 1h outputs no sound, and no output signal from superimposer 1i is output from antenna 1a.

The user of first terminal 1 recognizes the incoming call based on the ringer melody that is output from ringer melody speaker 1f.

In step 3d, the user of first terminal 1 operates input unit 1k to enter a talk start command for starting to talk to the calling party.

In response to the talk start command entered through input unit 1k, controller 1c controls baseband processor 1b to perform the baseband processing sequence. Moreover, controller 1c instructs superimposer 1g and superimposer 1i to operate.

Superimposer 1g superimposes the melody signal that is supplied from the sound source 1e on the speech signal that is supplied from baseband processor 1b, thereby generating a superimposed signal.

In step 3e, speech speaker 1h outputs a superposed sound that depends on the superimposed signal that is generated by superimposer 1g.

Therefore, when input unit 1k receives the talk start command from the user while ringer melody speaker 1f is outputting the melody, speech speaker 1h starts outputting a non-output part of the melody and the speech that is represented by the speech signal received by baseband processor 1b.

Controller 1c should preferably instruct sound source 1e to stop supplying the melody signal to ringer melody speaker 1f when input unit 1k receives the talk start command from the user.

Superimposer 1g superimposes the melody signal on the speech signal such that the volume of the melody, which is output from speech speaker 1h after input unit 1k has received the talk start command, will be lower than the volume of the melody, which is output from ringer melody speaker 1f before input unit 1k receives the talk start command.

Superimposer 1i superimposes the melody signal that is supplied from sound source 1e on a speech signal that is supplied from microphone 1j, generating a superimposed signal.

Superimposer 1i supplies the superimposed signal to baseband processor 1b. Baseband processor 1b modulates the output signal from superimposer 1i and sends the modulated output signal from antenna 1a as a talk radio signal to the calling terminal.

Therefore, the call device (the calling terminal) which has called first terminal 1 allows its own user to listen to the same melody as the melody output by first terminal 1, together with the speech input to first terminal 1. Superimposer 1i may be dispensed with.

When the melody signal is finished, sound source 1e stops outputting the melody signal. Therefore, after the melody signal stops being output, only speech is output from speech speaker 1h in step 3f. After the melody signal stops being output, only the speech signal that depends on the speech entered from microphone 1j is transmitted to the call device that has called first terminal 1.

After the parties that are involved have started talking to each other, the volume of the ringer melody becomes lower than the volume of the ringer melody before the parties start talking to each other. Consequently, the ringer melody is prevented from obstructing the talk.

The ringer melody is superposed on the speech from the calling party and output from speech speaker 1h. Therefore, the ringer melody is used as BGM for the conversation.

Controller 1c may control sound source 1e such that the volume of the melody, which is output from ringer melody speaker 1f after input unit 1k has received a talk start command, will be lower than the volume of the melody, which is output from ringer melody speaker 1f before input unit 1k receives the talk start command.

In this case, superimposer 1g may be dispensed with, and speech speaker 1h may output only the speech that depends on the speech signal that is output from baseband processor 1b. Because superimposer 1g can be dispensed with, the structure of first terminal 1 can be simplified.

Figure 4:
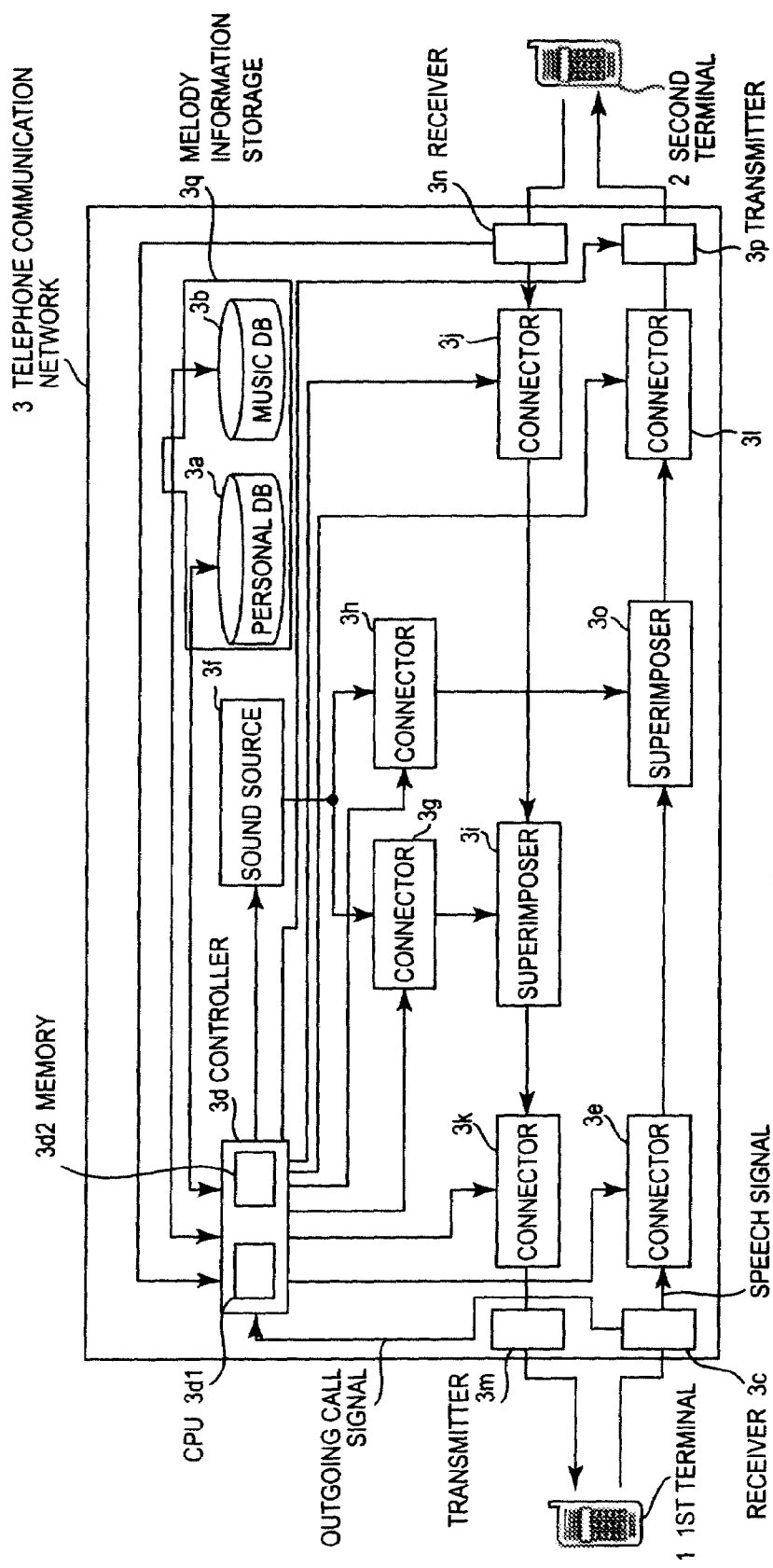
FIG. 4 is a block diagram of a call system according to another embodiment of the present invention.

FIG. 4 shows in block form a call system according to another embodiment of the present invention. Those parts of the call system shown in FIG. 4 that are identical to those of call system illustrated in FIG. 1 are denoted by identical reference characters.

In FIG. 4, first terminal 1 operates as a caller's terminal and second terminal 2 operates as a recipient's terminal. First terminal 1 and second terminal 2 shown in FIG. 4 are structurally similar to first terminal 1 and second terminal 2 shown in FIG. 2, except that first terminal 1 and second terminal 2 shown in FIG. 4 lack superimposer 1g and superimposer 1i shown in FIG. 2.

As shown in FIG. 4, telephone communication network 3 has personal database 3a, music database 3b, receiver 3c, controller 3d, connector 3e, sound source 3f, connector 3g, connector 3h, superimposer 3i, connector 3j, connector 3k, connector 3l, transmitter 3m, receiver 3n, superimposer 3o, and transmitter 3p.

Personal database 3a and music database 3b are included in melody information storage 3q in telephone communication network 3.

Telephone communication network 3 continuously supplies a ring back melody to first terminal 1 as the caller's terminal even after first terminal 1 and second terminal 2 have started talking to each other.

Melody information storage 3q stores settings of a ring back melody and melody information that represents the ring back melody (a melody for a predetermined period of time).

The user of second terminal 2 as the recipient's terminal presets the settings of the ring back melody and the melody information.

Personal database 3a stores the settings of the ring back melody.

For example, personal database 3a stores settings for outputting a melody for a predetermined period of time, in the form of music piece A, as a ring back melody to the terminal of registered person "a", e.g., first terminal 1, when the terminal of registered person "a" calls second terminal 2.

Music database 3b stores melody information that represents the music piece (the melody for the predetermined period of time) that is recorded in personal database 3a.

Receiver 3c receives a radio signal, e.g., an outgoing call signal, sent from first terminal 1. Receiver 3c supplies the received outgoing call signal to controller 3d. The outgoing call signal has information that represents the recipient's terminal and the caller's terminal.

Receiver 3c also receives a speech signal sent from first terminal 1. Receiver 3c supplies the received speech signal to connector 3e.

Controller 3d includes CPU 3d1 and memory 3d2. CPU 3d1 is an example of a computer. Memory 3d2 is an example of a recording medium that can be read by a computer.

Memory 3d2 stores a program that represents an operation sequence of telephone communication network 3. CPU 3d1 reads the program stored in memory 3d2, and executes the program to control telephone communication network 3.

A processing sequence that is executed by CPU 3d1 will hereafter be described as a processing sequence that is executed by controller 3d.

When controller 3d receives an outgoing call signal from receiver 3c, controller 3d sends an incoming call signal for second terminal 2 to transmitter 3p. Transmitter 3p sends the incoming call signal to second terminal 2.

When controller 3d receives the outgoing call signal from receiver 3c, controller 3d supplies a connection signal to connector 3g and connector 3k, and supplies a disconnection signal to connector 3e, connector 3h, connector 3j, and connector 3l. Each of connector 3e, connector 3g, connector 3h, connector 3j, connector 3k, and connector 3l operates as a switch.

Specifically, each of connector 3e, connector 3g, connector 3h, connector 3j, connector 3k, and connector 3l is turned on when supplied with a connection signal from controller 3d, and is turned off when supplied with a disconnection signal from controller 3d.

When controller 3d receives the outgoing call signal from receiver 3c, controller 3d reads melody information corresponding to the recipient's terminal and the caller's terminal represented by the outgoing call signal, from melody information storage 3q.

Specifically, when controller 3d receives the outgoing call signal from receiver 3c, controller 3d reads a music piece (music sound) corresponding to the recipient's terminal and the caller's terminal represented by the outgoing call signal, from personal database 3a.

Then, controller 3d reads the melody information that indicates the read music piece from music database 3b. Thereafter, controller 3d supplies the read melody information to sound source 3f.

When sound source 3f receives the melody information, sound source 3f starts outputting a melody signal that represents the melody for the predetermined period of time, which is represented by the melody information. Sound source 3f supplies the melody signal to connector 3g and connector 3h.

When connector 3g is turned on by the connection signal, connector 3g supplies the output signal from sound source 3f to superimposer 3i. Because controller 3d supplies the connection signal to connector 3g when receiver 3c receives the outgoing call signal, connector 3g supplies the output signal from sound source 3f to superimposer 3i when receiver 3c receives the outgoing call signal.

Superimposer 3i superimposes the output signal from connector 3g on the output signal from connector 3j.

At the time receiver 3c receives the outgoing call signal, connector 3j is supplied with the disconnection signal. Therefore, when receiver 3c receives the outgoing call signal, superimposer 3i outputs only the output signal from connector 3g, i.e., the melody signal.

When connector 3k receives the connection signal, connector 3k supplies the output signal from superimposer 3i to transmitter 3m. Because controller 3d supplies the connection signal to connector 3k when receiver 3c receives the outgoing call signal, connector 3k supplies only the output signal from superimposer 3i, i.e., the melody signal, to transmitter 3m when receiver 3c receives the outgoing call signal.

Transmitter 3m transmits the output signal from connector 3k to first terminal 1. Therefore, when receiver 3c receives the outgoing call signal from first terminal 1, transmitter 3m transmits the melody signal to first terminal 1.

Therefore, first terminal 1, which has sent the outgoing call signal for connection to second terminal 2, outputs the ring back melody preset by the user of second terminal 2.

Receiver 3n receives a speech signal sent from second terminal 2, and supplies the received speech signal to connector 3j and controller 3d.

When controller 3d receives the speech signal from receiver 3n, controller 3d supplies the connection signal to connector 3j, connector 3h, connector 3e, and connector 3l.

When connector 3j receives the connection signal, connector 3j supplies the speech signal that is output from receiver 3n to superimposer 3i.

Superimposer 3i superimposes the melody signal supplied from sound source 3f on the speech signal. Superimposer 3i sends its output signal through connector 3k and transmitter 3m to first terminal 1.

Therefore, first terminal 1 keeps outputting the ring back melody even after first terminal 1 has started talking to second terminal 2.

When connector 3h and connector 3e are turned on, superimposer 3o superimposes the melody signal from sound source 3f on the speech signal sent from first terminal 1.

Superimposer 3o sends its output signal through connector 3l and transmitter 3p to second terminal 2.

Therefore, the user of second terminal 2 is able to listen to the melody that is being output as the ring back melody from first terminal 1, together with the speech given by the user of first terminal 1.

Figure 5:
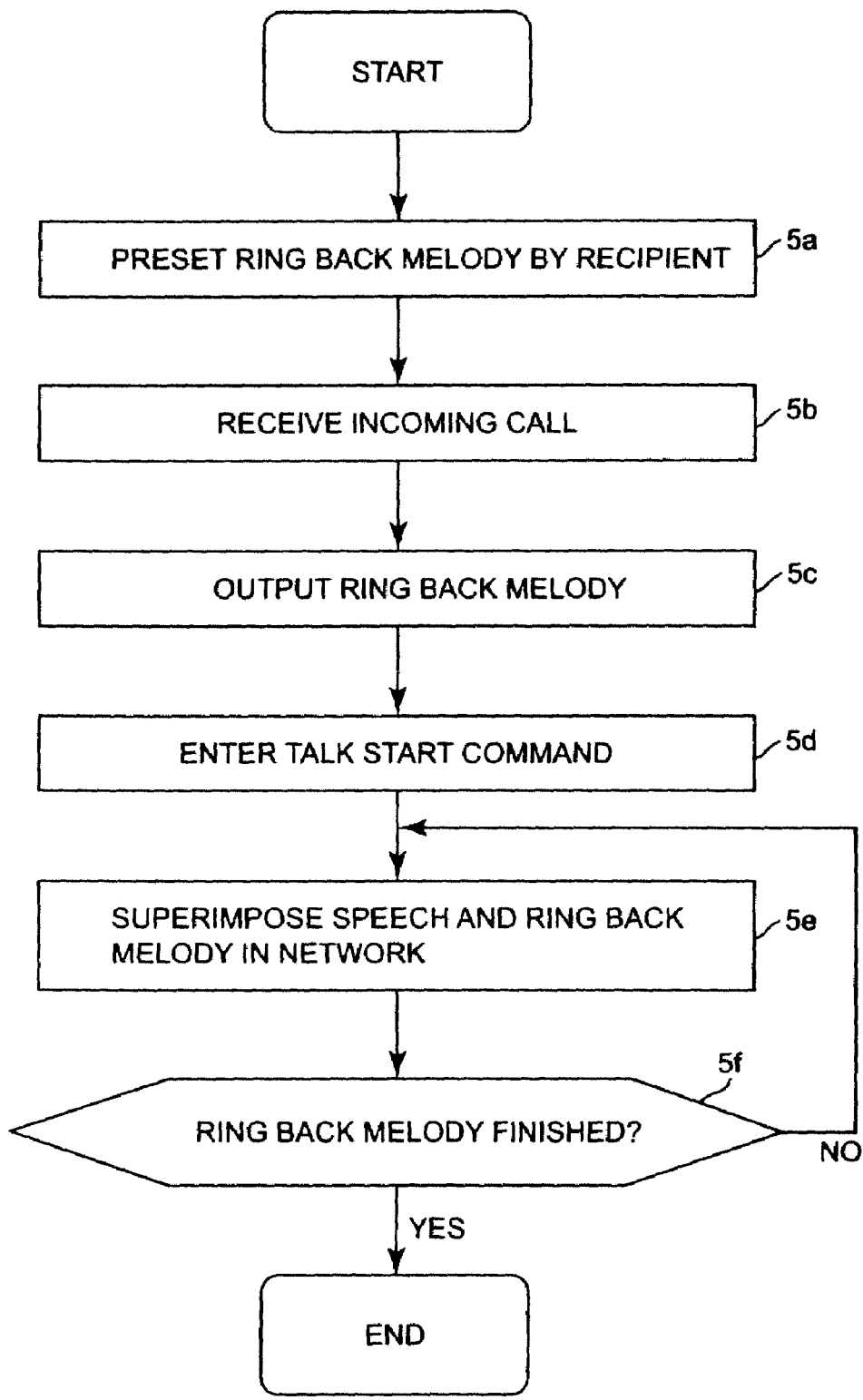
FIG. 5 is a flowchart of an operation sequence of the call system shown in FIG. 4.

FIG. 5 shows an operation sequence of telephone communication network 3. Operation of telephone communication network 3 will be described below with reference to FIG. 5.

In step 5a, second terminal 2 presets a ring back melody for first terminal 1 based on a control action that is made on input unit 1k by the user of second terminal 2.

Specifically, a ring back melody for first terminal 1 is preset by using the title of the melody, which is output from first terminal 1, instead of a ring back tone when first terminal 1 calls second terminal 2.

Second terminal 2 transmits the settings of the ring back melody for first terminal 1 to telephone communication network 3.

Receiver 3n of telephone communication network 3 receives the settings of the ring back melody for first terminal 1, and supplies the received settings of the ring back melody for first terminal 1 to controller 3d.

Controller 3d stores the settings of the ring back melody for first terminal 1 in melody information storage 3q, or specifically, personal database 3a.

In step 5b, when receiver 3c receives an outgoing call signal from first terminal 1 to second terminal 2, receiver 3c supplies the outgoing call signal to controller 3d.

When controller 3d receives the outgoing call signal from receiver 3c, controller 3d sends an incoming call signal for second terminal 2 to transmitter 3p. Transmitter 3p sends the incoming call signal to second terminal 2.

Controller 3d also supplies the connection signal to connector 3g and connector 3k and supplies the disconnection signal to connector 3e, connector 3h, connector 3j, and connector 3l.

Controller 3d reads melody information corresponding to the recipient's terminal and the caller's terminal represented by the outgoing call signal, from melody information storage 3q.

Specifically, when controller 3d receives the outgoing call signal from receiver 3c, controller 3d reads a music piece corresponding to the recipient's terminal and the caller's terminal represented by the outgoing call signal, from personal database 3a.

Then, controller 3d reads the melody information that indicates the music piece from music database 3b.

Thereafter, controller 3d supplies the read melody information to sound source 3f.

When sound source 3f receives the melody information, sound source 3f starts outputting a melody signal, which represents the melody for the predetermined period of time that is represented by the melody information. Sound source 3f supplies the melody signal to connector 3g and connector 3h.

Because connector 3g is supplied with the connection signal at this time, connector 3g supplies the output signal from sound source 3f to superimposer 3i. Because controller 3d supplies the disconnection signal to connector 3j when receiver 3c receives the outgoing call signal, superimposer 3i outputs only the output signal from connector 3g, i.e., the melody signal.

When receiver 3c receives the outgoing call signal, connector 3k is supplied with the connection signal from controller 3d. Therefore, connector 3k outputs only the output signal from connector 3i, i.e., the melody signal, to transmitter 3m.

In step 5c, transmitter 3m transmits the output signal from connector 3k to first terminal 1. Therefore, when receiver 3c receives the outgoing call signal from first terminal 1, transmitter 3m transmits the melody signal to first terminal 1. Consequently, first terminal 1 outputs the ring back melody that is preset by the user of second terminal 2.

In step 5d, when the user of second terminal 2 operates its input unit (a talk start button), second terminal 2 starts talking to first terminal 1.

Receiver 3n receives a speech signal transmitted from second terminal 2.

Receiver 3n supplies the speech signal to connector 3j and controller 3d.

When controller 3d receives the speech signal from receiver 3n, controller 3d supplies the connection signal to connector 3j, connector 3h, connector 3e, and connector 3l.

When connector 3j receives the connection signal, connector 3j supplies the speech signal that is output from receiver 3n to superimposer 3i.

In step 5e, superimposer 3i superimposes the melody signal from sound source 3f on the speech signal.

The output signal from superimposer 3i is transmitted through connector 3k and transmitter 3m to first terminal 1. Therefore, first terminal 1 keeps outputting the ring back melody even after first terminal 1 has started talking to second terminal 2.

In step 5f, when the melody signal is finished, sound source 3f stops outputting the melody signal. Therefore, after output of the melody signal stops, first terminal 1 and second terminal 2 talk to each other based on the speech signal with no melody superimposed thereon.

According to the present embodiment, the ring back melody is output even after the parties that are involved have started talking to each other. Consequently, the user of first terminal 1 as the caller's terminal can fully enjoy the ring back melody that is output upon making the call.

According to the present embodiment, the call control system generates a signal that represents a superimposed sound that comprises both a ring back melody and speech. Therefore, as shown in FIG. 2, the recipient's call device is not required to generate a superimposed sound signal and transmit the generated superimposed sound signal through the telephone communication network to the caller's call device.

The present embodiment may be modified as follows:

The music sound title (music piece title) of a ring back melody and the name of the vendor thereof are stored in melody information storage 3q.

When a ring back melody is transmitted to the caller's terminal, controller 3d reads the music sound title of a ring back melody and the name of the vendor thereof from melody information storage 3q.

Controller 3d transmits both or either the music sound title of a ring back melody or the name of the vendor thereof, which have been read, from transmitter 3m to the caller's terminal.

The user of the caller's terminal can now be aware of the title of a desired melody that has been preset by the user of the recipient's terminal or the name of the vendor thereof. Therefore, the purchase of the desired melody can be promoted.

Controller 3d may control sound source 3f such that the volume of a melody, which depends on a melody signal that is output from transmitter 3m after receiver 3n has received a speech signal, will be lower than the volume of the melody, which depends on the melody signal that is output from transmitter 3m before receiver 3n receives the speech signal. In this case, the ring back melody is prevented from obstructing the talk.

Operational details about a ringer melody at the recipient's terminal and operational details about a ring back melody at the caller's terminal may be preset as desired by the user of the recipient's terminal.

For example, the user of the recipient's terminal may make settings about whether a ringer melody is continuously output even after the terminals have started talking to each other or not, whether a ring back melody is continuously output even after the terminals have started talking to each other or not, and whether a ringer melody and a ring back melody are identical to each other and a ringer melody and a ring back melody are output synchronously with each other or not.

For example, the user of the recipient's terminal may set information as to whether a ringer melody is continuously output even after the terminals have started talking to each other or not, whether a ring back melody is continuously output even after the terminals have started talking to each other or not, and whether a ringer melody and a ring back melody are identical to each other and a ringer melody and a ring back melody are output synchronously with each other or not, in the recipient's terminal.

The user of the recipient's terminal transmits the set information from the recipient's terminal to telephone communication network 3.

Telephone communication network 3 then stores the transmitted information in melody information storage 3q, e.g., personal database 3a.

For example, furthermore, the user of the recipient's terminal may set information as to whether a ringer melody is continuously output even after the terminals have started talking to each other or not, whether a ring back melody is continuously output even after the terminals have started talking to each other or not, and whether a ringer melody and a ring back melody are identical to each other and a ringer melody and a ring back melody are output synchronously with each other or not, in melody information storage 3q, e.g., personal database 3a, of telephone communication network 3 through the Internet.

Telephone communication network 3 transmits the set information to the recipient's terminal, and then the recipient's terminal stores the transmitted information in melody information storage 1d thereof.

FIG. 6 shows an example of information as to whether a ringer melody is continuously output even after the terminals have started talking to each other or not, whether a ring back melody is continuously output even after the terminals have started talking to each other or not, and whether a ringer melody and a ring back melody are identical to each other and a ringer melody and a ring back melody are output synchronously with each other or not, the information being set in the recipient's terminal by the user thereof.

For example, the information shown in FIG. 6 is stored in melody information storage 1d of the recipient's terminal.

FIG. 7 shows an example of information as to whether a ringer melody is continuously output even after the terminals have started talking to each other or not, whether a ring back melody is continuously output even after the terminals have started talking to each other or not, and whether a ringer melody and a ring back melody are identical to each other and a ringer melody and a ring back melody are output synchronously with each other or not, the information being stored in melody information storage 3q, e.g., personal database 3a, of telephone communication network 3.

In FIGS. 6 and 7, the items indicated by "○" are those, as set by the user of the recipient's terminal, which can take place.

For example, with respect to an incoming call from registered person "a", a ringer melody of music piece A is continued even after the parties have started talking to each other, and a ring back melody of music piece A is finished at the same time that the parties start talking to each other, and the ringer melody of music piece A and the ring back melody of music piece A are not synchronized with each other.

With respect to an incoming call from registered person "c", a ringer melody of music piece C and a ring back melody of music piece C are synchronized with each other, the ringer melody of music piece C is finished at the same time that the parties start talking to each other, and ring back melody of music piece C finished at the same time that the parties start talking to each other.

If the settings shown in FIGS. 6 and 7 are made in the caller's terminal and telephone communication network 3, then the same melody information is stored in melody information storage 1d of the caller's terminal and melody information storage 3q, specifically, music database 3b, of telephone communication network 3.

Based on the set information stored in melody information storage 3q, specifically, personal database 3a, as shown in FIG. 7, controller 3d controls the turning on/off of connector 3h and connector 3g, and the relationship between the timing to transmit the incoming call signal from transmitter 3p and the timing to supply the melody information to sound source 3f.

Controller 3d performs the above controlling operation with respect to whether a ringer melody is continuously output even after the terminals have started talking to each other or not, whether a ring back melody is continuously output even after the terminals have started talking to each other or not, and whether a ringer melody and a ring back melody are identical to each other and a ringer melody and a ring back melody are output synchronously with each other or not.

For example, if a ringer melody is continuously output even after the terminals have started talking to each other, then controller 3d turns on connector 3h when receiver 3n receives a speech signal. If second terminal 2 is a terminal capable of continuously outputting the ringer melody even after the terminals have started talking to each other, as shown in FIG. 2, then controller 3d does not turn on connector 3h.

If a ringer melody is stopped after the terminals have started talking to each other, then second terminal 2 stops outputting the ringer melody after the terminals have started talking to each other, and controller 3d does not turn on connector 3h.

If a ring back melody is continuously output even after the terminals have started talking to each other, then controller 3d keeps connector 3g continuously turned on even when receiver 3n receives a speech signal. If second terminal 2 is a terminal capable of outputting the melody together with the speech after the terminals have started talking to each other, as shown in FIG. 2, then controller 3d turns off connector 3h when receiver 3n receives a speech signal.

If a ring back melody is stopped after the terminals have started talking to each other, then second terminal 2 does not superimpose the melody on the speech signal that is input after the terminals have started talking to each other, and controller 3d turns off connector 3g when receiver 3n receives a speech signal.

Figure 8:
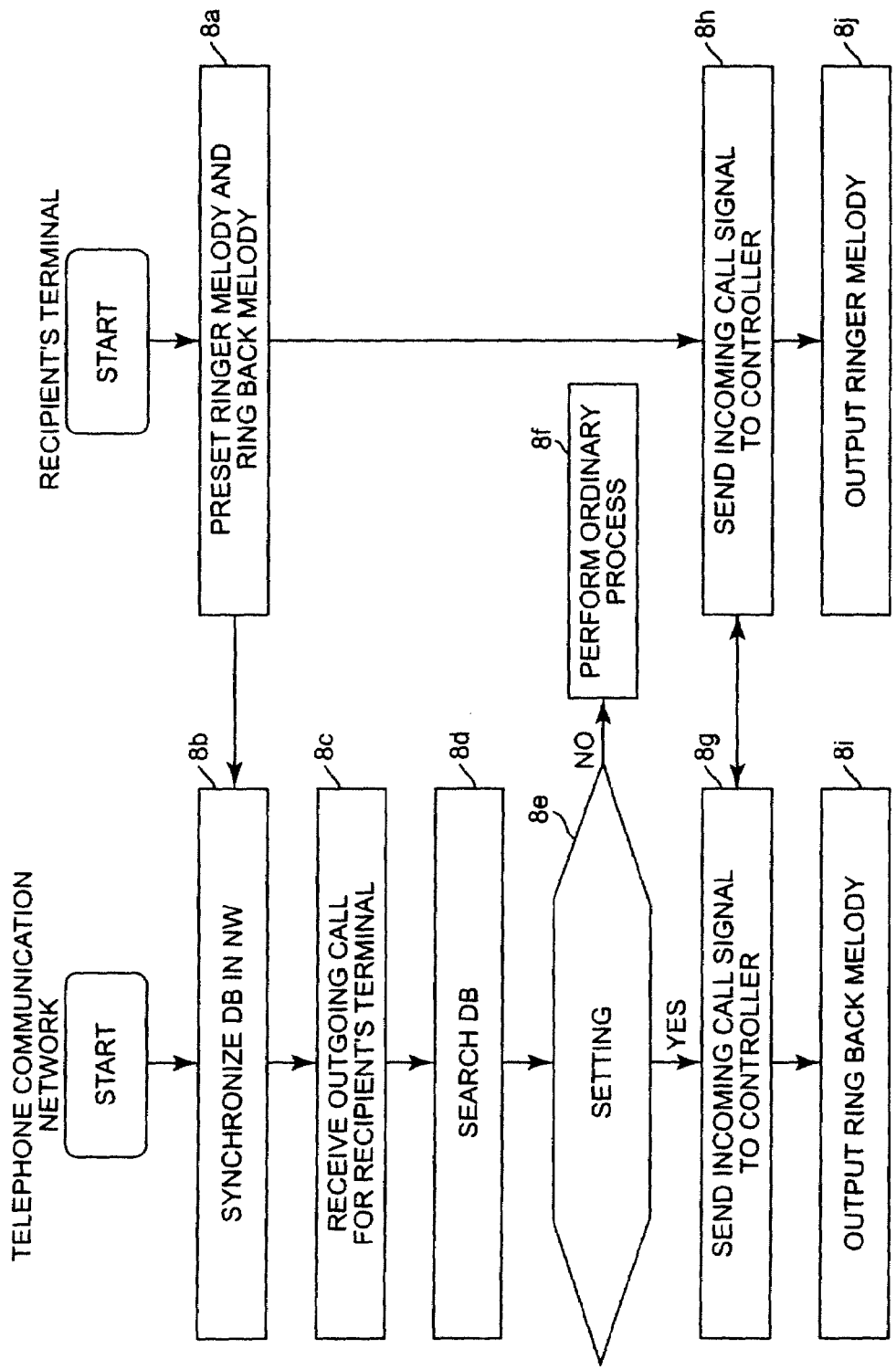
FIG. 8 is a flowchart of an operation sequence of the call system shown in FIG. 4.

FIG. 8 shows an operation sequence for synchronizing a ringer melody and a ring back melody with each other. The operation sequence for synchronizing a ringer melody and a ring back melody with each other will be described below with reference to FIG. 8.

Second terminal 2 as a recipient's terminal may be the terminal shown in FIG. 2 or a terminal that stops outputting a ringer melody at the same time that the terminals start talking to each other. In the present embodiment, the terminal shown in FIG. 2 is used as second terminal 2 that serves as a recipient's terminal.

In step 8a, second terminal 2 makes settings with respect to the ringer melody and the ring back melody as shown in FIG. 6, for example, when the user of second terminal 2 operates input unit 1k. The settings are stored in melody information storage 1d in second terminal 2.

When the user of second terminal 2 operates input unit 1k, second terminal 2 transmits the settings with respect to the ringer melody and the ring back melody to telephone communication network (NW) 3.

In step 8b, controller 3d stores the transmitted settings with respect to the ringer melody and the ring back melody in melody information storage 3q, specifically, personal database 3a.

Thereafter, in step 8c, when receiver 3c receives an outgoing call signal that is sent from first terminal 1 to second terminal 2, receiver 3c supplies the outgoing call signal to controller 3d.

When controller 3d receives the outgoing call signal from receiver 3c, controller 3d supplies the connection signal to connector 3g and connector 3k, and supplies the disconnection signal to connector 3e, connector 3h, connector 3j, and connector 3l.

In step 8d, controller 3d reads information corresponding to the recipient's terminal (the recipient) and the caller's terminal (the registered person representing the caller) which are represented by the outgoing call signal, from melody information storage 3q, specifically, personal database 3a.

In step 8e, controller 3d confirms whether synchronization has been set as information for the recipient's terminal and the caller's terminal.

If synchronization has not been set as information for the recipient's terminal and the caller's terminal, then controller 3d executes step 8f.

In step 8f, controller 3d performs a process that depends on the information which has been set for the recipient's terminal and the caller's terminal.

If synchronization has been set as information for the recipient's terminal and the caller's terminal, then controller 3d sends an incoming call signal for second terminal 2 to transmitter 3p.

In step 8g, transmitter 3p transmits the incoming call signal for second terminal 2.

When second terminal 2 receives the incoming call signal in step 8h, second terminal 2 executes step 8j.

In step 8j, second terminal 2 outputs, as a ringer melody, a melody that represents a music piece related to the synchronization setting in the information shown in FIG. 6 that has been preset in melody information storage 1d.

If synchronization has been set as information for the recipient's terminal and the caller's terminal, then controller 3d reads melody information that represents a music piece related to the synchronization setting from melody information storage 3q, specifically, music database 3b.

Controller 3d supplies the read melody information for sound source 3f synchronously with the transmission of the incoming call signal, and transmits a melody signal to first terminal 1 so that first terminal 1 will output the ring back melody.

In step 8i, when first terminal 1 receives the melody signal, first terminal 1 outputs the ring back melody.

In the present embodiment, if synchronization is preset, then telephone communication network 3 synchronizes the transmission of an incoming call signal to first terminal 1 with the generation of a melody signal from sound source 3f.

Because the ring back melody that is output from first terminal 1 and the ringer melody that is output from second terminal 2 are identical to each other, the recipient can confirm the amount of the ring back melody to which the calling party has already listened, by listening to the ringer melody. Therefore, the recipient can determined whether the caller has fully enjoyed the ring back melody or not.

Figure 9:
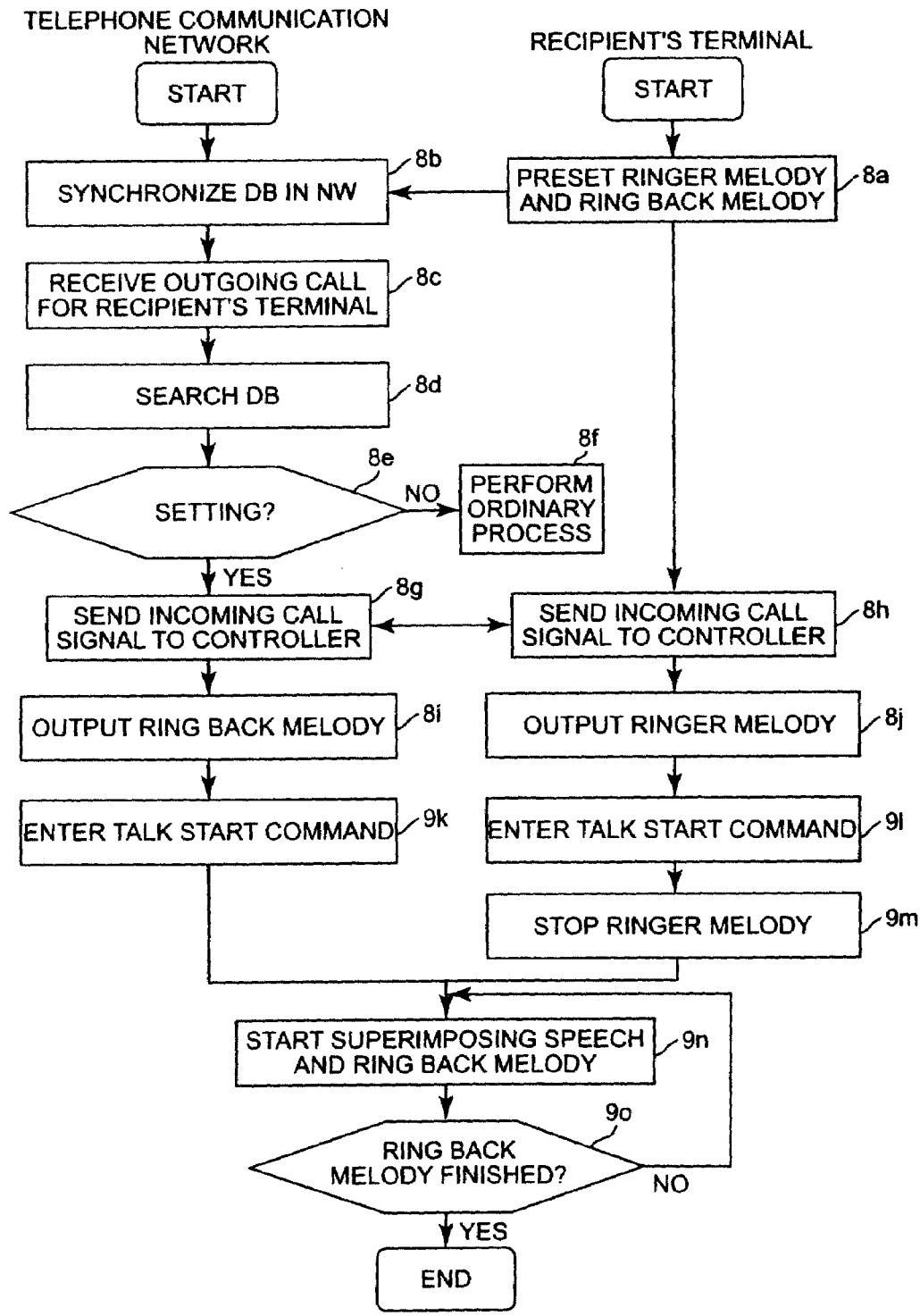
FIG. 9 is a flowchart of an operation sequence of the call system shown in FIG. 4.

FIG. 9 shows an operation sequence for making the music pieces of a ringer melody and a ring back melody identical to each other, synchronizing the ringer melody and the ring back melody with each other, and continuously outputting the ringer melody and the ring back melody even after the parties involved have started talking to each other.

Steps shown in FIG. 9 that are identical to those shown in FIG. 8 are denoted by identical reference characters. In the present embodiment, the terminal shown in FIG. 2 is used as second terminal 2.

The operation sequence for making the music pieces of a ringer melody and a ring back melody identical to each other, synchronizing the ringer melody and the ring back melody with each other, and continuously outputting the ringer melody and the ring back melody even after the parties involved have started talking to each other, will be described below with reference to FIG. 9.

Steps 8a through 8j shown in FIG. 9 are identical to the corresponding steps shown in FIG. 8, and will not be described in detail below.

If input unit 1k of second terminal 2 is operated by the user of second terminal 2 in steps 9k, 9l while the ringer melody is being output from second terminal 2 and the ring back melody, which is identical to the ringer melody, is being output from first terminal 1, then second terminal 2 and first terminal 1 start talking to each other.

When second terminal 2 and first terminal 1 start talking to each other, controller 1c of second terminal 2 shuts off sound source 1e, thereby stopping output of the ringer melody.

When receiver 3n receives a speech signal, controller 3d of telephone communication network 3 supplies the connection signal to connector 3j, connector 3h, connector 3e, and connector 3l. Therefore, step 9n is executed.

Specifically, when connector 3g and connector 3j are turned on, superimposer 3i superimposes the melody signal from sound source 3f on the speech signal from second terminal 2.

Transmitter 3m transmits the output signal from superimposer 3i to first terminal 1.

Therefore, the user of first terminal 1 can listen to a non-output part of the ring back melody as BGM for the conversation even after the user of first terminal 1 has started talking to the user of second terminal 2.

Superimposer 3o superimposes the melody signal from sound source 3f on the speech signal from first terminal 1.

Transmitter 3p transmits the output signal from superimposer 3o to second terminal 2. Consequently, the user of second terminal 2 can listen to a non-output part of the ringer melody as BGM for the conversation even after the user of second terminal 2 has started talking to the user of first terminal 1.

In step 9o, if the melody signal is finished, then sound source 3f stops outputting the melody signal. After the melody signal stops being output, first terminal 1 and second terminal 2 talk to each other based on the speech signal with no melody superimposed thereon.

According to the present embodiment, first terminal 1 and second terminal 2 output the same melody synchronously until the melody has ended. Therefore, the user of first terminal 1 and the user of second terminal 2 can enjoy the same melody from the beginning to the end even if the users are in remotely spaced locations.

According to the present embodiment, after the user of first terminal 1 and the user of second terminal 2 have started talking to each other, telephone communication network 3 superimposes the melody and the speech on each other. Therefore, the recipient's terminal suffers a smaller burden because the recipient's terminal is not required to superimpose the melody and the speech on each other after the caller's terminal and the recipient's terminal have started talking to each other.

The process of outputting the same melody synchronously until the melody has finished from first terminal 1 and second terminal 2 is not limited to the above details, but may be modified appropriately.

For example, the following modifications may be made in the process of outputting the same melody synchronously until the melody finishes from first terminal 1 and second terminal:

Even when second terminal 2 and first terminal 1 have started talking to each other, controller 1c of second terminal 2 does not shut off sound source 1e.

Superimposer 1i of second terminal 2 is dispensed with, and the output signal from microphone 1j is input to baseband processor 1b.

When receiver 3n receives the speech signal, controller 3d does not supply the connection signal to connector 3h, but supplies the connection signal to connector 3j, connector 3e, and connector 3l. Therefore, telephone communication network 3 does not superimpose the melody signal on the speech signal, but transmits the speech signal from first terminal 1 to second terminal 2.

After the caller's terminal and the recipient's terminal have started talking to each other, telephone communication network 3 and the recipient's terminal superimpose the melody and the speech on each other. Therefore, the processing burden on either the recipient's terminal or telephone communication network 3 is prevented from being unduly increased because neither the recipient's terminal nor telephone communication network 3 alone superimposes the melody and the speech on each other after the caller's terminal and the recipient's terminal have started talking to each other.

Alternatively, only the recipient's terminal may superimpose the melody and the speech on each other.

For example, when receiver 3n receives the speech signal, controller 3d does not supply the connection signal to connector 3h, but supplies the connection signal to connector 3j, connector 3e, and connector 3l and supplies the disconnection signal to connector 3g. Thus, telephone communication network 3 does not superimpose the speech signal and the melody signal on each other.

Even when second terminal 2 and first terminal 1 have started talking to each other, controller 1c of second terminal 2 does not shut off sound source 1e, and superimposer 1g and superimposer 1i of second terminal 2 superimpose the melody and the speech on each other.

In this case, after the caller's terminal and the recipient's terminal have started talking to each other, the recipient's terminal superimposes the melody and the speech on each other. Consequently, telephone communication network 3 suffers a smaller burden because telephone communication network 3 is not required to superimpose the melody and the speech on each other after the caller's terminal and the recipient's terminal have started talking to each other.

In response to the reception of an outgoing call signal, telephone communication network 3 transmits an incoming call signal to start outputting a ringer melody and transmits a melody signal for a ring back melody. Therefore, even if the special synchronizing process shown in FIG. 8 or FIG. 9 is not performed, first terminal 1 and second terminal 2 output one melody synchronously, provided that the ringer melody and the ring back melody are identical to each other.

In each of the above embodiments, the illustrated details are given by way of example only, and the present invention is not limited to those details, but various changes and modifications may be made therein.

For example, each of sound source 1e and sound source 1f may successively output a plurality of melody signals each representing a melody for a predetermined period of time.

Specifically, each of sound source 1e and sound source 1f may repeat a melody signal representing a melody for a predetermined period of time a fixed number of times. Alternatively, each of sound source 1e and sound source 1f may successively output a plurality of melody signals each representing another melody extracted from melody information storage 1d and melody information storage 3q.

In this case, controller 1c or controller 3d should preferably output a melody, which is outputted when a talk start command is issued from the recipient's call device, for a predetermined period of time until the melody finisfes.

While preferred embodiments of the present invention have been described using specific terms, such description is for illustrative purposes only, and it is to be understood that changes and variations may be made without departing from the spirit or scope of the following claims.

What is claimed is:

1. A call management system comprising:
   a call device comprising:
   a call device melody information storage for storing melody information that represents a melody for a predetermined period of time;
   a call device receiver for receiving an incoming call signal and a speech signal that represents speech of a caller;
   a talk start command input unit for accepting a talk start command from a user; and
   a call device output unit for starting outputting the melody represented by the melody information stored in said call device melody information storage when said incoming call signal is received by said call device receiver, and starting outputting a non-output part of the melody and the speech represented by the speech signal received by said call device receiver when said talk start command is accepted by said talk start command input unit while the melody is being outputted; and
   a call control system for transmitting an incoming call signal to a recipient's call device specified by an outgoing call signal and supplying a melody signal representing a predetermined melody to a caller's call device when the outgoing call signal specifying the recipient's call device is accepted from the caller's call device, comprising:

a system melody information storage for storing melody information representing a melody for a predetermined period of time;

an outgoing call signal acceptor for accepting said outgoing call signal;

an incoming call signal transmitter for transmitting the incoming call signal to the recipient's call device specified by the outgoing call signal when said outgoing call signal is accepted by said outgoing call signal acceptor;

a recipient's speech signal receiver for receiving a speech signal supplied from said recipient's call device; and a caller's call device transmitter for starting to transmit the melody signal representing the melody represented by the melody information stored in said system melody information storage to said caller's call device when said incoming call signal is transmitted by said incoming call signal transmitter, and starting to transmit a superimposed sound signal which is representative of a non-transmitted part of the melody superimposed on said speech signal to said caller's call device when said speech signal is received by said recipient's speech signal receiver while said melody signal is being transmitted, wherein said call device is used as said recipient's call device;

wherein said call device melody information storage stores melody information which is identical to the melody information stored in said system melody information storage.

2. A call management system comprising:

a call device comprising:

a call device melody information storage for storing melody information that represents a melody for a predetermined period of time;

a call device receiver for receiving an incoming call signal and a speech signal that represents speech of a caller;

a talk start command input unit for accepting a talk start command from a user; and a call device output unit for starting outputting the melody represented by the melody information stored in said call device melody information storage when said incoming call signal is received by said call device receiver, and starting outputting a non-output part of the melody and the speech represented by the speech signal received by said call device receiver when said talk start command is accepted by said talk start command input unit while the melody is being outputted, said call device output unit comprising a caller speech superimposer for superimposing the non-output part of the melody on the speech represented by the speech signal received by said call device receiver when said talk start command is accepted by said talk start command input unit while the melody is being outputted, and a superimposed sound output unit for outputting a superimposed sound generated by said caller speech superimposer; and a call control system for transmitting an incoming call signal to a recipient's call device specified by an outgoing call signal and supplying a melody signal representing a predetermined melody to a caller's call device when the outgoing call signal specifying the recipient's call device is accepted from the caller's call device, comprising:

a system melody information storage for storing melody information representing a melody for a predetermined period of time;

an outgoing call signal acceptor for accepting said outgoing call signal;

an incoming call signal transmitter for transmitting the incoming call signal to the recipient's call device specified by the outgoing call signal when said outgoing call signal is accepted by said outgoing call signal acceptor;

a recipient's speech signal receiver for receiving a speech signal supplied from said recipient's call device; and a caller's call device transmitter for starting to transmit the melody signal representing the melody represented by the melody information stored in said system melody information storage to said caller's call device when said incoming call signal is transmitted by said incoming call signal transmitter, and starting to transmit a superimposed sound signal which is representative of a non-transmitted part of the melody superimposed on said speech signal to said caller's call device when said speech signal is received by said recipient's speech signal receiver while said melody signal is being transmitted, wherein said call device is used as said recipient's call device;

wherein said recipient's call device further comprises:

a recipient's speech acceptor for accepting recipient's speech when said talk start command is accepted by said talk start command input unit;

a recipient's speech superimposer for superimposing the non-output part of said melody from said call device output unit on the recipient's speech accepted by said recipient's speech acceptor when said talk start command is accepted by said talk start command input unit while said call device output unit is outputting the said melody; and a recipient's speech signal transmitter for transmitting an output signal from said recipient's speech superimposer to said call control system; wherein said system melody information storage stores melody information which is identical to the melody information stored in said call device melody information storage;

said recipient's speech signal receiver receives the output signal of said recipient's speech superimposer which is transmitted from said recipient's speech signal transmitter; and said caller's call device transmitter transmits the output signal of said recipient's speech superimposer to said caller's call device when the output signal of said recipient's speech superimposer is received by said speech signal receiver while the melody is being transmitted.

3. A call management system comprising:

a call device comprising:

a call device melody information storage for storing melody information that represents a melody for a predetermined period of time;

a call device receiver for receiving an incoming call signal and a speech signal that represents speech of a caller;

a talk start command input unit for accepting a talk start command from a user; and a call device output unit for starting outputting the melody represented by the melody information stored in said call device melody information storage when said incoming call signal is received by said call device receiver, and starting outputting a non-output part of the melody and the speech represented by the speech signal received by said call device receiver when said talk start command is accepted by said talk start command input unit while the melody is being outputted; and a call control system for transmitting an incoming call signal to a recipient's call device specified by an outgoing call signal and supplying a melody signal representing a predetermined melody to a caller's call device when the outgoing call signal specifying the recipient's call device is accepted from the caller's call device, comprising:

a system melody information storage for storing melody information representing a melody for a predetermined period of time;

an outgoing call signal acceptor for accepting said outgoing call signal;

an incoming call signal transmitter for transmitting the incoming call signal to the recipient's call device specified by the outgoing call signal when said outgoing call signal is accepted by said outgoing call signal acceptor;

a recipient's speech signal receiver for receiving a speech signal supplied from said recipient's call device; and a caller's call device transmitter for starting to transmit the melody signal representing the melody represented by the melody information stored in said system melody information storage to said caller's call device when said incoming call signal is transmitted by said incoming call signal transmitter, and starting to transmit a superimposed sound signal which is representative of a non-transmitted part of the melody superimposed on said speech signal to said caller's call device when said speech signal is received by said recipient's speech signal receiver while said melody signal is being transmitted, said caller's call device transmitter comprising a recipient's speech superimposer for superimposing the non-transmitted part of the melody on the speech signal to generate a superimposed sound signal when said speech signal is received by said recipient's speech signal receiver while said melody signal is being transmitted, said recipient's speech signal transmitter transmitting the superimposed sound signal generated by said recipeint's speech superimposer to said caller's call device, wherein said call device is used as said recipient's call device;

wherein said call control system further comprises:

a caller's speech acceptor for accepting a speech signal representing caller's speech;

a caller's speech superimposer for superimposing the non-transmitted part of said melody on said speech signal when said speech signal is received by said recipient's speech signal receiver while said caller's call device transmitter is transmitting the melody to said caller's call device; and a caller's superimposed signal transmitter for transmitting a superimposed sound signal representing a superimposed sound generated by said caller's speech superimposer to said recipient's call device;

wherein said call device melody information storage stores melody information which is identical to the melody information stored in said system melody information storage;

said call device receiver receives the superimposed sound signal transmitted from said caller's superimposed signal transmitter; and said call device output unit starts outputting the non-output part of the melody and the speech represented by the speech signal received by said call device receiver based on the superimposed sound signal received by said call device receiver when said talk start command is accepted by said talk start command inPut unit while the melody is being output.

4. A call management system comprising:

a call device comprising:

a call device melody information storage for storing melody information that represents a melody for a predetermined period of time;

a call device receiver for receiving an incoming call signal and a speech signal that represents speech of a caller;

a talk start command input unit for accepting a talk start command from a user; and a call device output unit for starting outputting the melody represented by the melody information stored in said call device melody information storage when said incoming call signal is received by said call device receiver, and starting outputting a non-output part of the melody and the speech represented by the speech signal received by said call device receiver when said talk start command is accepted by said talk start command input unit while the melody is being outputted, said call device output unit comprising a caller speech superimposer for superimposing the non-output part of the melody on the speech represented by the speech signal received by said call device receiver when said talk start command is accepted by said talk start command input unit while the melody is being outputted, and a superimposed sound output unit for outputting a superimposed sound generated by said caller speech superimposer; and a call control system for transmitting an incoming call signal to a recipient's call device specified by an outgoing call signal and supplying a melody signal representing a predetermined melody to a caller's call device when the outgoing call signal specifying the recipient's call device is accepted from the caller's call device, comprising:

a system melody information storage for storing melody information representing a melody for a predetermined period of time;

an outgoing call signal acceptor for accepting said outgoing call signal;

an incoming call signal transmitter for transmitting the incoming call signal to the recipient's call device specified by the outgoing call signal when said outgoing call signal is accepted by said outgoing call signal acceptor;

a recipient's speech signal receiver for receiving a speech signal supplied from said recipient's call device; and a caller's call device transmitter for starting to transmit the melody signal representing the melody represented by the melody information stored in said system melody information storage to said caller's call device when said incoming call signal is transmitted by said incoming call signal transmitter, and starting to transmit a superimposed sound signal which is representative of a non-transmitted part of the melody superimposed on said speech signal to said caller's call device when said speech signal is received by said recipient's speech signal receiver while said melody signal is being transmitted, said caller's call device transmitter comprising a recipient's speech superimposer for superimposing the non-transmitted part of the melody on the speech signal to generate a superimposed sound signal when said speech signal is received by said recipient's speech signal receiver while said melody signal is being transmitted, said recipient's speech signal transmitter transmitting the superimposed sound signal generated by said recipeint's speech superimposer to said caller's call device, wherein said call device is used as said recipient's call device;

wherein said call device melody information storage stores melody information which is identical to the melody information stored in said system melody information storage.

5. A call control method to be performed by a call management system including a call device for performing a call control method comprising the steps of:

(a) receiving an incoming call signal;

(b) starting to output a melody for a predetermined period of time which is represented by melody information stored in a call device melody information storage when said incoming call signal is received;

(c) accepting a talk start command from a user;

(d) receiving a speech signal representing caller's speech when said talk start command is accepted; and (e) starting to output a non-output part of the melody and the speech represented by said speech signal when said talk start command is accepted while the melody is being output; and a call control system for performing a call control method of transmitting an incoming call signal to a recipient's call device specified by an outgoing call signal and supplying a melody signal representing a predetermined melody to a caller's call device when the outgoing call signal specifying the recipient's call device is accepted from the caller's call device, comprising the steps of:

(f) accepting said outgoing call signal;

(g) transmitting an incoming call signal to the recipient's call device specified by the outgoing call signal when said outgoing call signal is accepted;

(h) starting to transmit the melody signal representing a melody for a predetermined period of time represented by melody information stored in a system melody information storage to said caller's call device when said incoming call signal is transmitted;

(i) receiving a speech signal supplied from said recipient's call device; and (j) starting transmitting a superimposed sound signal which is representative of a non-transmitted part of the melody superimposed on said speech signal to said caller's call device when said speech signal is received while said melody signal is being transmitted, wherein said call device is used as said recipient's call device;

wherein said call device melody information storage stores melody information which is identical to the melody information stored in said system melody information storage.

6. A call control method to be performed by a call management system including a call device for performing a call control method comprising the steps of:

(a) receiving an incoming call signal;

(b) starting to output a melody for a predetermined period of time which is represented by melody information stored in a call device melody information storage when said incoming call signal is received;

(c) accepting a talk start command from a user;

(d) receiving a speech signal representing caller's speech when said talk start conmiand is accepted; and (e) starting to output a non-output part of the melody and the speech represented by said speech signal when said talk start command is accepted while the melody is being output, wherein said step (e) comprises the steps of superimposing the non-output part of the melody on the speech represented by the speech signal when said talk start command is accepted while the melody is being output, and outputting a superimposed sound generated in said superimposing step; and a call control system for performing a call control method of transmitting an incoming call signal to a recipient's call device specified by an outgoing call signal and supplying a melody signal representing a predetermined melody to a caller's call device when the outgoing call signal specifying the recipient's call device is accepted from the caller's call device, comprising the steps of:

(f) accepting said outgoing call signal;

(g) transmitting an incoming call signal to the recipient's call device specified by the outgoing call signal when said outgoing call signal is accepted;

(h) starting to transmit the melody signal representing a melody for a predetermined period of time represented by melody information stored in a system melody information storage to said caller's call device when said incoming call signal is transmitted;

(i) receiving a speech signal supplied from said recipient's call device; and (j) starting transmitting a superimposed sound signal which is representative of a non-transmitted part of the melody superimposed on said speech signal to said caller's call device when said speech signal is received while said melody signal is being transmitted, wherein said call device is used as said recipient's call device, further comprising the steps of:

(k) accepting recipient's speech when said talk start command is accepted;

(l) superimposing the non-output part of said melody on the recipient's speech when said talk start command is accepted while the said melody is being output; and (m) transmitting an output signal generated in said superimposing step to said call control system;

wherein said system melody information storage stores melody information which is identical to the melody information stored in said call device melody information storage;

said step (i) comprising the step of receiving the output signal transmitted in said step (m); and said step (j) comprising the step of transmitting said output signal to said caller's call device when said output signal is received while the melody is being transmitted.

7. A call control method to be performed by a call management system including a call device for performing a call control method comprising the steps of:

(a) receiving an incoming call signal;

(b) starting to output a melody for a predetermined period of time which is represented by melody information stored in a call device melody information storage when said incoming call signal is received;

(c) accepting a talk start command from a user;

(d) receiving a speech signal representing caller's speech when said talk start command is accepted; and
(e) starting to output a non-output part of the melody and the speech represented by said speech signal when said talk start command is accepted while the melody is being output; and
a call control system for performing a call control method of transmitting an incoming call signal to a recipient's call device specified by an outgoing call signal and supplying a melody signal representing a predetermined melody to a caller's call device when the outgoing call signal specifying the recipient's call device is accepted from the caller's call device, comprising the steps of:
(f) accepting said outgoing call signal;
(g) transmitting an incoming call signal to the recipient's call device specified by the outgoing call signal when said outgoing call signal is accepted;
(h) starting to transmit the melody signal representing a melody for a predetermined period of time represented by melody information stored in a system melody information storage to said caller's call device when said incoming call signal is transmitted;
(i) receiving a speech signal supplied from said recipient's call device; and
(j) starting transmitting a superimposed sound signal which is representative of a non-transmitted part of the melody superimposed on said speech signal to said caller's call device when said speech signal is received while said melody signal is being transmitted, wherein said call device is used as said recipient's call device, said starting transmitting comprising superimposing the non-transmitted part of the melody on the speech signal to generate a superimposed sound signal when said speech signal is received while said melody signal is being transmitted, and transmitting the superimposed sound signal to said caller's call device,
further comprising the steps of:
(k) accepting a speech signal representing caller's speech;
(l) superimposing the non-transmitted part of said melody on said speech signal when said speech signal is received while the melody is being transmitted to said caller's call device; and
(m) transmitting a superimposed sound signal representing a superimposed sound generated in said step (l) to said recipient's call device;
wherein said call device melody information storage stores melody information which is identical to the melody information stored in said system melody information storage;
said step (i) comprising the step of receiving the superimposed sound signal; and
said step (j) comprising the step of starting to output the non-output part of the melody and the speech represented by the speech signal based on the superimposed sound signal when said talk start command is accepted while the melody is being outputted.

8. A call control method to be performed by a call management system including a call device for performing a call control method comprising the steps of:
(a) receiving an incoming call signal;
(b) starting to output a melody for a predetermined period of time which is represented by melody information stored in a call device melody information storage when said incoming call signal is received;
(c) accepting a talk start command from a user;
(d) receiving a speech signal representing caller's speech when said talk start command is accepted; and
(e) starting to output a non-output part of the melody and the speech represented by said speech signal when said talk start command is accepted while the melody is being output, wherein said step (e) comprises the steps of superimposing the non-output part of the melody on the speech represented by the speech signal when said talk start command is accepted while the melody is being output, and outputting a superimposed sound generated in said superimposing step; and
a call control system for performing a call control method of transmitting an incoming call signal to a recipient's call device specified by an outgoing call signal and supplying a melody signal representing a predetermined melody to a caller's call device when the outgoing call signal specifying the recipient's call device is accepted from the caller's call device, comprising the steps of:
(f) accepting said outgoing call signal;
(g) transmitting an incoming call signal to the recipient's call device specified by the outgoing call signal when said outgoing call signal is accepted;
(h) starting to transmit the melody signal representing a melody for a predetermined period of time represented by melody information stored in a system melody information storage to said caller's call device when said incoming call signal is transmitted;
(i) receiving a speech signal supplied from said recipient's call device; and
(j) starting transmitting a superimposed sound signal which is representative of a non-transmitted part of the melody superimposed on said speech signal to said caller's call device when said speech signal is received while said melody signal is being transmitted, wherein said call device is used as said recipient's call device, said starting transmitting comprising superimposing the non-transmitted part of the melody on the speech signal to generate a superimposed sound signal when said speech signal is received while said melody signal is being transmitted, and transmitting the superimposed sound signal to said caller's call device,
wherein said call device melody information storage stores melody information which is identical to the melody information stored in said system melody information storage.

* * * * *